United States Patent [19]

Chase

[11] 4,267,631

[45] May 19, 1981

[54] DEVICE AND METHOD FOR REPLACING ROPE CARRIERS ON DRYER ROLLS OF PAPER MAKING MACHINES

[76] Inventor: Verlin R. Chase, 1246 Simmons, Antioch, Calif. 94509

[21] Appl. No.: 42,857

[22] Filed: May 29, 1979

[51] Int. Cl.³ .................. B23P 19/00; F16H 7/08; B21F 1/10; B25B 27/14
[52] U.S. Cl. .................. 29/426.1; 29/433; 29/464; 29/241; 29/281.6; 29/235; 29/450; 162/348; 474/130
[58] Field of Search .......... 29/402.08, 281.6, 235, 29/426.5, 241, 271, 433, 426.1, 450, 464; 81/3 R; 74/242, 242.6, 242.7; 162/348

[56] References Cited

U.S. PATENT DOCUMENTS

| 242,020 | 5/1881 | Mitchell | 74/242.7 |
| 315,615 | 4/1885 | Harnsberger | 74/242.7 |
| 346,067 | 7/1886 | Ray | 74/242.7 |
| 685,926 | 11/1901 | Mundlas | 74/242.7 |
| 1,318,727 | 10/1919 | Cohn | 74/242.7 |
| 3,138,963 | 6/1964 | Prince | 29/464 UX |

Primary Examiner—Charlie T. Moon
Attorney, Agent, or Firm—Phillips, Moore, Weissenberger, Lempio & Majestic

[57] ABSTRACT

A guide device for replacing a rope of a rope carrier on a dryer roll of a paper making machine comprises a fastener for attaching the device to the roll and a guide for guiding the rope back onto the roll. In carrying forth the method herein, the guide device is attached to the roll, the rope is placed over the guide device, and the roll is rotated to replace the rope thereon.

13 Claims, 6 Drawing Figures

DEVICE AND METHOD FOR REPLACING ROPE CARRIERS ON DRYER ROLLS OF PAPER MAKING MACHINES

TECHNICAL FIELD

This invention relates to a device and method whereby one or more paper carrying ropes may be replaced on a dryer-roll of a paper making machine.

BACKGROUND ART

Fourdrinier machines are commonly used for making paper and paperboard up to speeds of three-thousand (3,000) fpm. In such machines, a pulp slurry flows out of a headbox and through a narrow slot controlled by long, sharp-edged plate, commonly known as a slice. The pulp then falls onto a moving copper-wire screen as it is moved around a breast roll and is then carried along over a series of table rolls where some of the water content of the pulp is enabled to run out. The partially demoisturized pulp is then run over suction boxes where still more water is removed so that when the pulp reaches a couch roll the pulp contains approximately twenty percent (20%) fiber and eighty percent (80%) water.

The screen is shaken from side-to-side approximately two hundred (200) times per second as it moves along to thus cause the fibers to be laid in random fashion. When the pulp leaves the screen, it progresses into press rolls wherein it is carried by a woolen felt blanket to squeeze more water therefrom. The press rolls deliver the pulp, which is now formed into a raw paper, into the dryer section of the machine wherein it passes in and out between steam-heated rolls operating at surface temperatures in the range of from 150°–275° F., to reduce the moisture content of the raw paper to approximately 4–8% by weight.

The dryer rolls normally consist of a set of cast-iron cylinders which are driven simultaneously by a train of gears and heated internally by steam. A continuous web of dryer felt presses the paper against the rolls to absorb moisture therefrom. The leading end or tail of the raw paper is fed into the dryer section by a nip comprised of a draw roll which receives a rope carrier thereon, consisting of a pair of endless ropes carried within grooves defined on one end of the dryer rolls.

The rope carrier carries the narrow tail throughout the dryer section whereafter the width of the paper is increased to substantially cover the dryer rolls. The ropes of the rope carrier continuously function to carry the paper through the dryer section and any dislodgement of one or both of the ropes from any one or more of the dryer rolls, such as when there is a break in the paper, will require that the rope or ropes be replaced thereon.

In order to replace the dislodged rope on a respective one of the dryer rolls, the dryer section must be shut-down and three or four men are required to rewrap the rope on the drum. In addition to being time-consuming, conventional procedures for replacing the rope on the dryer roll subjects the workmen to injury, including burns occasioned by a workman's physical contact with the drum which remains heated.

DISCLOSURE OF THE INVENTION

The present invention overcomes the above, briefly described problems by providing a guide device and method for expeditiously replacing a rope on a rotatable roll of a paper-making machine without subjecting the workmen to injury.

The guide device comprises fastening means for releasably attaching it to the roll, and guide means for receiving and moving the rope into an annular groove formed on the roll in response to rotation of the roll.

The method includes the steps of attaching the guide device to the roll, adjacent to and on an outboard side of the groove, and rotating the roll to permit the guide device to engage and automatically reposition the dislodged rope in the groove whereafter the guide device is attached from the roll.

BRIEF DESCRIPTION OF DRAWINGS

Other objects and advantages of this invention will become apparent from the following description and accompanying drawings wherein.

BEST MODE OF CARRYING OUT THE INVENTION

Figure 1:
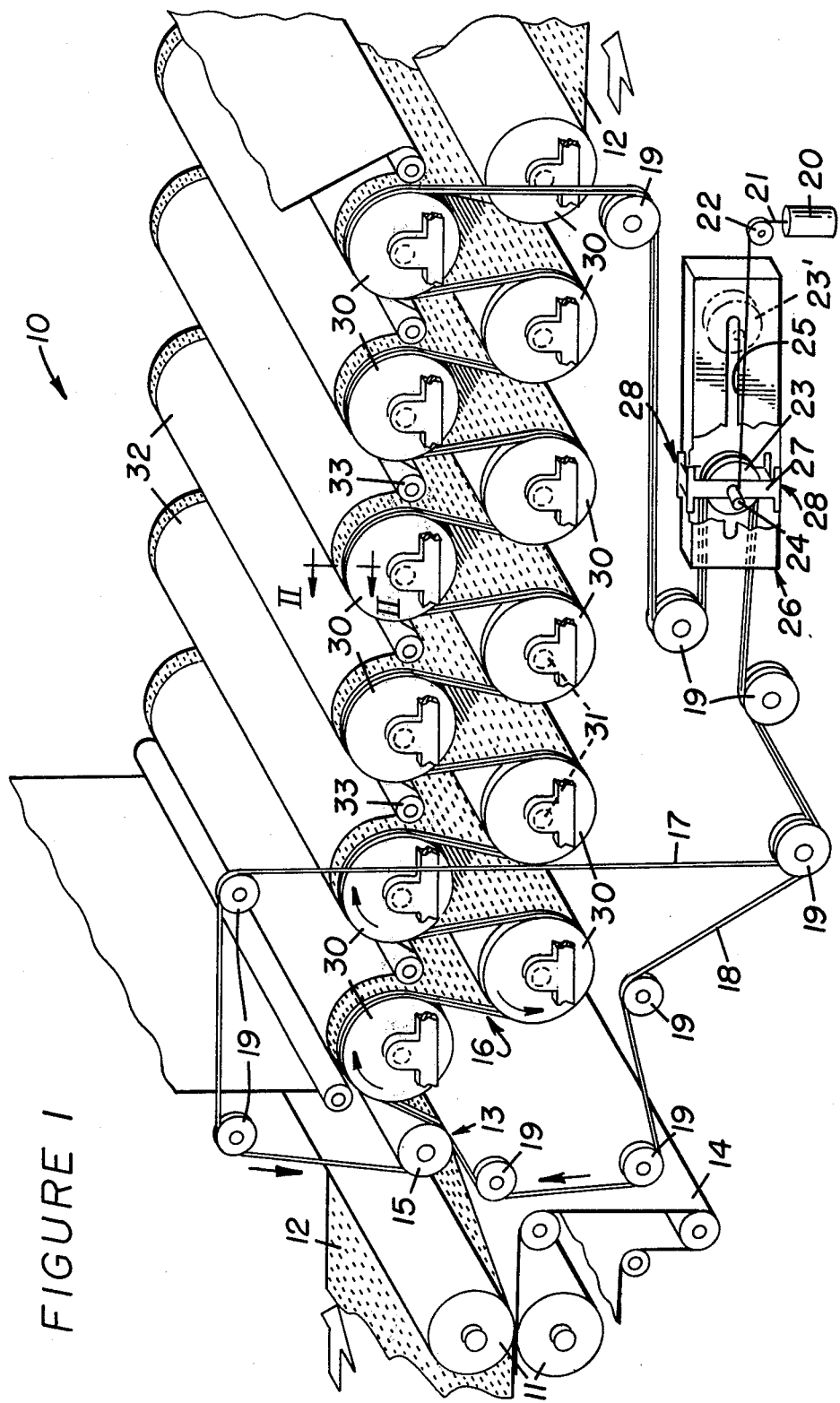
FIG. 1 schematically illustrates a dryer section of a paper-making machine, including a rope carrier for carrying paper therethrough for drying purposes.

FIG. 1 illustrates a dryer section 10 of a paper making machine, such as a Fourdrinier machine. A pair of driven press rolls 11 are mounted at the downstream end of dryer section 10 to feed a sheet of raw paper 12 between a nip 13 which receives the paper for carrying it into the dryer section. A standard web of press felt 14 accompanies paper 12 throughout its travel between press rolls 11 to absorb moisture therefrom in a conventional manner.

Nip 13 comprises a driven draw roll 15 and a carrier 16, consisting of a pair of endless ropes 17 and 18 entrained over draw roll 15 and a plurality of suitably mounted fixed sheaves 19. Ropes 17 and 18 are held under a predetermined tension in a conventional manner by a weight 20. A cable 21 is entrained over a fixed sheave 22 and a reciprocal sheave 23, having ropes 17 and 18 entrained thereover. Sheave 23 is rotatably mounted on a shaft 24 which is reciprocally mounted in a slot 25, defined in a mounting bracket 26.

A reciprocal carrier bracket 27 has shaft 24 rotatably mounted thereon and is slidably mounted on mounting bracket 26 by a pair of standard tongue and groove arrangements 28, for example. Mounting bracket 26 is adapted to be attached to the main frame of dryer section 10. The illustrated tensioning system for rope carrier 16 functions in a conventional manner to retract pulley 23 to its illustrated phantom-line position 23′ when ropes 17 and 18 become dislodged from one or more of a plurality of metallic dryer rolls 30.

Each dryer roll 30 is rotatably mounted on a shaft 31 with the shafts being interconnected for simultaneous rotation in a conventional manner by a suitably integrated gear train (not shown). Normally, only one of the shafts is rotated by a drive motor. As described above, steam is communicated internally of the hollowed-out dryer rolls to heat them to the desired temperature (150°-275° F.) for paper drying purposes. In addition, an endless web of felt 32, entrained over sheaves 33 and the upper set of dryer rolls 30, functions to overlie and compress the paper against such rolls to absorb moisture therefrom in a conventional manner.

Figure 3:
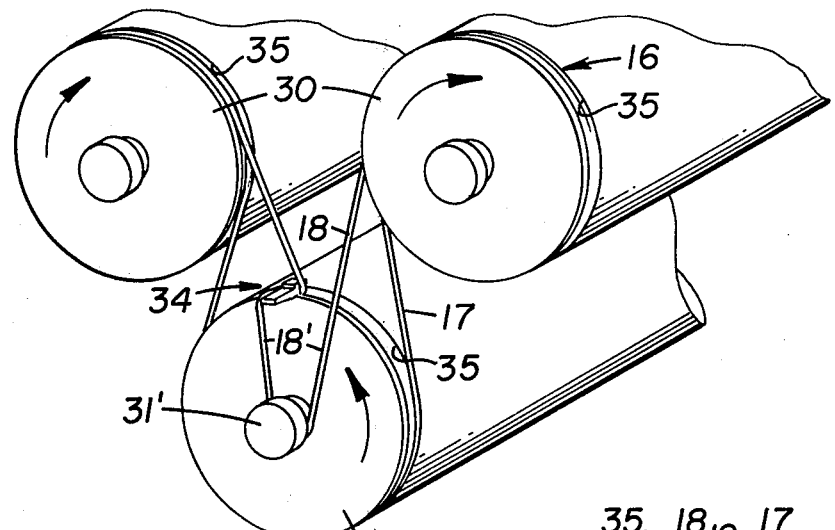
FIGS. 3 and 4 sequentially illustrate the replacement of a dislodged rope of the rope carrier on a dryer roll of the dryer section.
Figure 4:
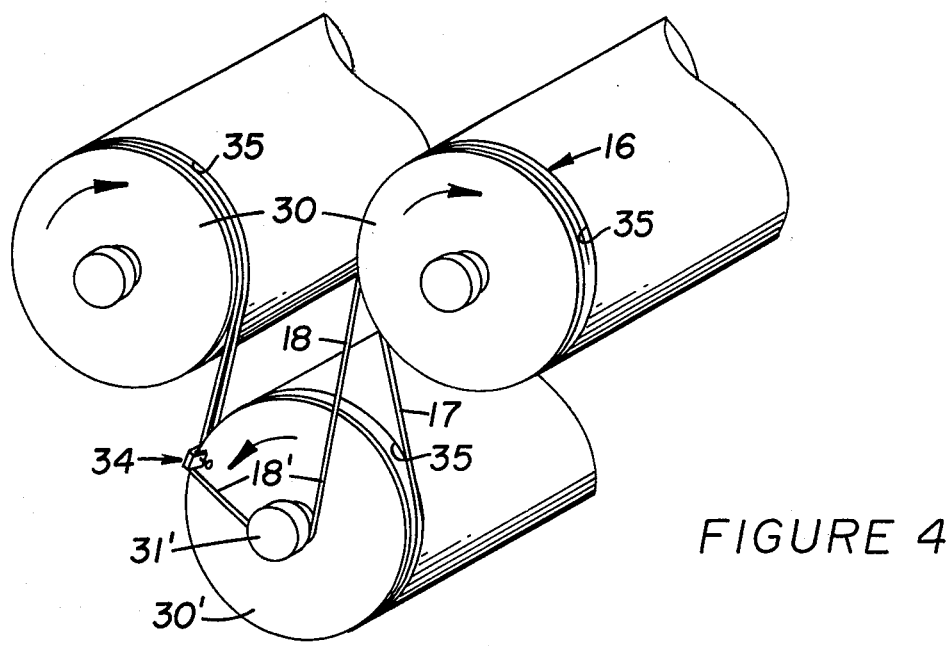

The above, briefly described dryer section 10 is conventional and further description thereof is deemed unnecessary for a full understanding of the hereinafter described invention. This invention is directed to a guide device 34 (FIGS. 3-5) and method for replacing one or both ropes 17 and 18 to their operative paper-carrying positions illustrated in FIG. 2 on one or more of dryer rolls 30 upon dislodgement of the ropes from the rolls. FIGS. 3 and 4 sequentially illustrate initial steps utilized to replace rope 18 on one of the dryer rolls.

In conventional practice, such dislodgement of the ropes from the rolls will first require a shut-down of dryer section 10 and then release of weight 20 to slacken tension on the ropes by moving pulley 23 from its phantom-line position 23' to its full line position illustrated in FIG. 1. Three or four workmen are then required to replace the ropes on the rolls by use of any available tool and, in particular, shear brute strength. This procedure is not only time-consuming, but also subjects the workmen to potential physical injury, including possible contact with heated dryer rollers 30.

Figure 2:
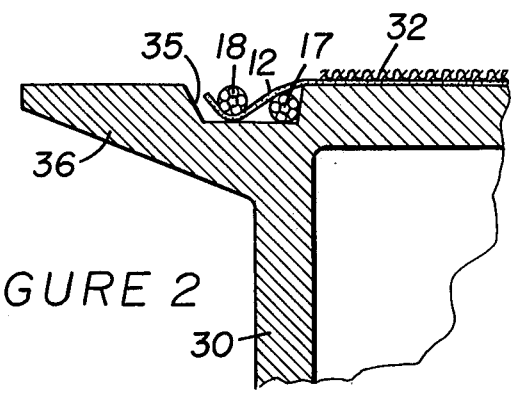
FIG. 2 is an enlarged sectional view, taken in the direction of arrows II—II in FIG. 1, illustrating the disposition of the rope carrier within an annular groove defined on a dryer roll employed in the dryer section.
Figure 5:
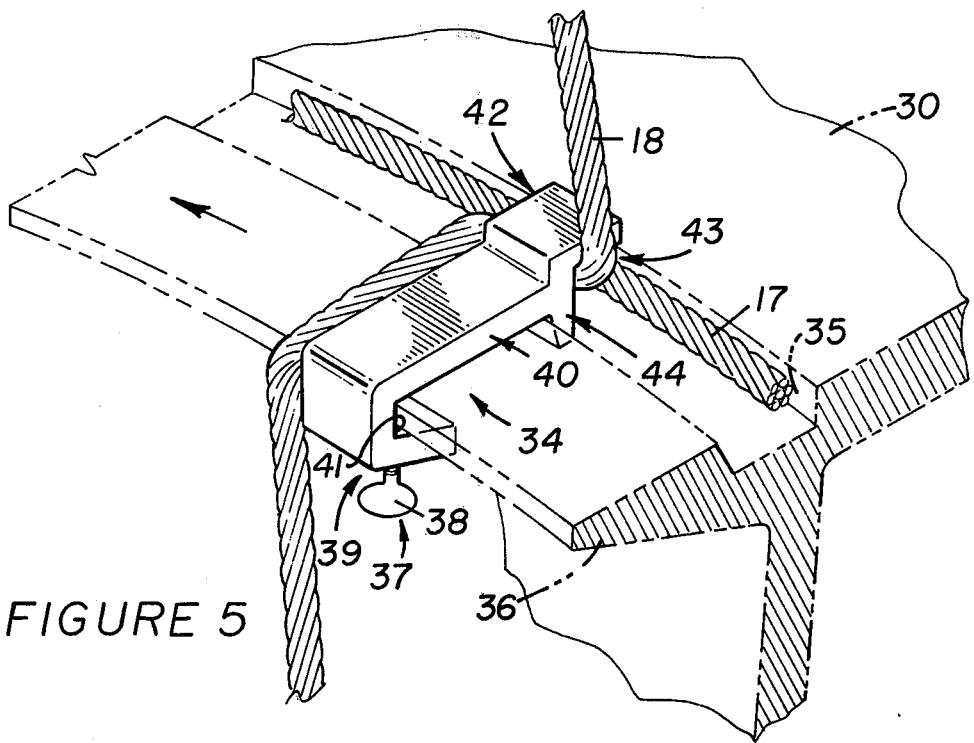
FIG. 5 is an enlarged isometric view illustrating a first guide device embodiment of this invention, shown attached to an end of a dryer roll to adapt it for replacement of a dislodged rope of the rope carrier on the roll.

Referring to FIG. 5, guide device 34 of the present invention is adapted to be detachably secured on each roll 30 to avoid the above prior art problems by providing for the expeditious and economical replacement of any dislodged rope 17 and/or 18 back into the roll. Roll 30 has an annular groove 35 formed thereon and disposed adjacent to an end thereof to normally receive ropes 17 and 18 therein, as shown in FIG. 2. Guide device 34 is releasably attached to an outer, annular flange 36 of roll 30 to automatically reposition the ropes in the groove, as described more fully hereinafter.

Guide device 34 comprises a fastening means 37, shown in the form of a set screw 38, for releasably clamping the device to flange 36 of the roll. In addition or in lieu of set screw 38, one or more magnets could be secured to guide device 34 to hold it on the roll. Set screw 38 is threadably mounted in a generally L-shaped outboard mounting flange 39 of device 34 which is secured to an intermediate mounting flange 40 to define an elongated slot 41 through the guide device, accommodating an end of similarly shaped flange 36 therein. It should be noted that the set screw is threadably mounted in a portion of flange 39 which underlies flange 36.

A guide flange 42 extends outwardly from flange 40 to partially overlie groove 35 and to define an elongated recess 43 with an inboard mounting flange 44 which is perpendicular thereto. The recess is sufficiently large to permit ropes 17 and 18 to pass therethrough and into groove 35. Flange 44 is disposed within groove 35 and straddles flange 36 of roll 30, along with flange 39, to thus prevent lateral movement of guide device 34 relative to the rolls.

Figure 6:
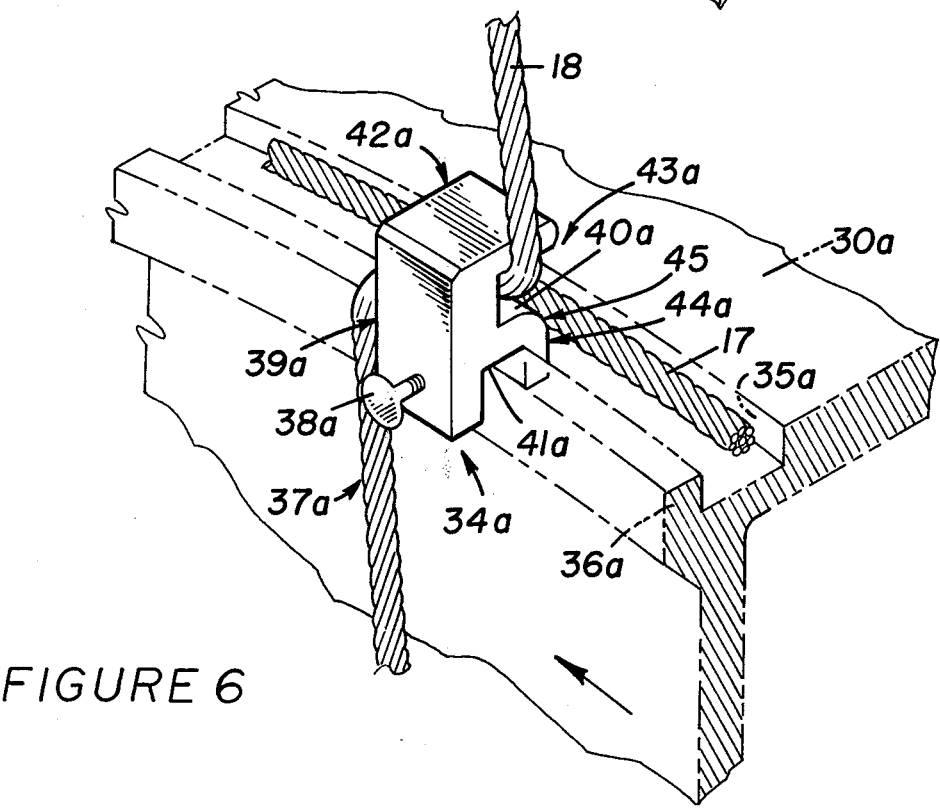
FIG. 6 is a view similar to FIG. 5, but illustrates a second guide device embodiment of the present invention.

FIG. 6 illustrates a second guide device embodiment 34a wherein identical numerals depict corresponding constructions, but with numerals appearing in FIG. 6 depicting modified constructions being accompanied by an "a". Guide device 34a is adapted to be clamped onto a modified dryer roll 30a, having an annular groove 35a and a radial flange 36a defined adjacent to an outer end thereof. A fastening means 37a, also known in the form of a set screw 38a, is threadably mounted in an outboard mounting flange 39a of guide device 34a.

An elongated slot 41a is defined through guide device 34a by flange 39a and by intermediate and inboard mounting flanges 40a and 44a, respectively. Flange 44a is disposed within annular groove 35a of the roll and straddles flange 36a of the roll, along with outboard flange 39a which is parallel thereto. Slot 41a thus accommodates guide device 34a on flange 36a of the roll whereby securance of the end of the set screw 38a against the outer surface of flange 36a will cooperate with inner flange 44a to clamp the device to flange 36a A guide flange 42a overlies flange 40a and groove 35a and is disposed in perpendicular relationship relative to flanges 39a and 44a. An elongated recess 43a is thus defined to permit 17 and 18 to pass therethrough and into groove 35a. If so desired, the juncture of flanges 40a and 44a may be rounded at 45 to accommodate a smooth movement of ropes 17 and/or 18 within groove 35a in a manner hereinafter more fully described.

Guide devices 34 and 34a may be formed of any suitable rigid metallic or plastic material, such as aluminum, cast iron, or steel. The devices, since they exhibit uniform cross sections throughout their lengths, may be extruded and cut to length to economize on manufacturing costs. The only machining costs would involve surface finishing, if needed, and tapping of threaded holes for set screws 38 and 38a.

INDUSTRIAL APPLICABILITY

FIGS. 3 and 4 sequentially illustrate initial steps employed in the remounting of one or both ropes 17 and 18 within annular groove 35 of roll 30 by use of guide device 34. Guide device 34a is utilized for replacing the ropes in substantially the same manner as hereinafter described.

As discussed above, such dislodgement of the ropes from one or more of the rolls normally occurs when there is a break in the processed paper. The hereinafter described method provides for the expeditious replacement of such ropes on the roll without having to disassemble weight 20 and its associated pulley mechanism and also avoids potential injury to the workmen.

Referrings to FIGS. 3-5, upon dislodgement of rope 18 from groove 35 of roll 30', for example, guide device 34 is clamped onto flange 36 of the roll by set screw 38. The rope is shown in its dislodged position and wrapped on axle 31 of roll 30' in FIG. 3. Guide device 34 is clamped to the roll to dispose it within a convoluted portion 18' of the rope, and closely adjacent to the rope. The rope has sufficient slack to permit it to be hand-placed over guide flange 42a and within recess 43, as shown in FIG. 5. The rope is now fully captured under guide flange 42 and between the guide device and the roll.

Rotation of roll 30' counterclockwise in FIGS. 3 and 4 (and simultaneous rotation of the other rolls) will force the leading side of guide device 34 against rope 18 to move it into groove 35. Upon full rotation of the roll, rope 18 will be fully rewraped thereupon. The guide device is then detached from the roll and the same procedure is followed for replacing any other portions of the ropes which have left any of the other rolls.

I claim:

1. In a paper making machine having a plurality of dryer rolls rotatably mounted therein, a rope installing guide device for replacing a rope on one of the rotatable dryer rolls of the paper making machine, said dryer roll having a annular groove in part defined by an outboard flange disposed adjacent to an end thereof for normally receiving a pair of ropes therein, said guide device comprising fastening means for releasably clampingly attaching said guide device to an inside and outside of said flange of said dryer roll, and guide means for receiving and moving at least one of said ropes into the groove formed on said dryer roll, upon dislodgement of said rope from said groove, in response to rotation of said dryer roll, said guide means including guide flange means extending inwardly in at least partial overlying relationship relative to said annular groove to define a circumferential extending recess between said guide flange means and said annular groove for permitting said rope to be positioned in said recess in captured relationship under said guide flange means and against a leading side of said guide means to automatically move said rope into said annular groove upon rotation of said dryer roll.

2. The guide device of claim 1 further comprising means defining an elongated slot through said guide device for mounting said guide device on said flange.

3. The guide device of claim 2 wherein said last-mentioned means defining said elongated slot includes a plurality of mounting flanges disposed in straddling relationship relative to the outer flange of said dryer roll.

4. The guide device of claim 3 wherein said fastening means is mounted in one of the mounting flanges of said guide device for engaging the outer flange of said dryer roll to releasably secure said guide device thereto.

5. The guide device of claim 4 wherein said fastening means includes at least one set screw threadably mounted on said one of the mounting flanges of said guide device.

6. The guide device of claim 2 wherein said last-mentioned means comprises inboard and outboard flange means for disposition on either side of the outer flange of said dryer roll for preventing lateral movement of said guide device relative to said dryer roll.

7. The guide device of claim 6 wherein said outboard flange means is generally L-shaped in cross section to comprise a portion adapted to underlie the outer flange of said dryer roll and which has said fastening means mounted thereon.

8. The guide device of claim 6 wherein said inboard and outboard flange means are disposed in at least substantial parallel relationship relative to each other and wherein said fastening means is mounted on said outboard flange means.

9. The guide device of claim 1 further comprising an inboard flange means for disposition within the annular groove defined on said dryer roll.

10. The guide device of claim 9 wherein said guide flange means is secured directly to said inboard flange means.

11. The guide device of claim 9 wherein said guide flange means is disposed in spaced relationship relative to said inboard flange means to define a recess therebetween.

12. A method for replacing a dislodged, endless rope back onto a rotatable dryer roll of a paper making machine having a plurality of dryer rolls, said dryer roll having an annular groove in part defined by an outboard flange disposed adjacent to an end thereof for normally receiving a pair of ropes therein, comprising the steps of clampingly attaching a guide device to said dryer roll, to an inside and outside of said flange of said groove, and in captured relationship relative to a convoluted portion of said rope, said attaching step including the step of positioning a guide flange of said guide device in at least partial overlying relationship relative to said groove to define a recess thereat and capturing said rope in said recess to prevent dislodgement of said rope from said recess upon rotation of said dryer roll, placing said rope over said guide device, and rotation said dryer roll to engage a leading side of said guide device with said rope to automatically reposition said rope in said groove.

13. The method of claim 12 further comprising the step of detaching said guide device from said dryer roll.

* * * * *

UNITED STATES PATENT AND TRADEMARK OFFICE
CERTIFICATE OF CORRECTION

PATENT NO. : 4,267,631
DATED : May 19, 1981
INVENTOR(S) : VERLIN R. CHASE

It is certified that error appears in the above—identified patent and that said Letters Patent is hereby corrected as shown below:

At Column 2, line 12, "attached" should be --detached--.

At Column 4, line 8, "known" should be --shown--.

At Column 4, line 18, "of the set screw" should be --of set screw--.

At Column 6, line 43, "rotation" should be --rotating--.

Signed and Sealed this

Twenty-fifth Day of August 1981

[SEAL]

Attest:

Attesting Officer

GERALD J. MOSSINGHOFF

Commissioner of Patents and Trademarks